March 27, 1934.   E. M. EVLETH   1,952,915
URN
Filed Nov. 10, 1932

INVENTOR
Earl M. Evleth
BY Wm. O. Bell
ATTORNEY

Patented Mar. 27, 1934

1,952,915

UNITED STATES PATENT OFFICE 1,952,915

URN

Earl M. Evleth, Park Ridge, Ill., assignor to The Bastian-Blessing Company, Chicago, Ill., a corporation of Illinois Application November 10, 1932, Serial No. 641,962

8 Claims. (Cl. 53—3)

This invention relates to urns and more particularly to urns of the combination type used in the brewing of beverages such as coffee and the like.

Urns of the combination type usually have a fitting leading to the water jacket, wherein the water is heated, and the incoming water flows through this fitting into the jacket. The outlet for the heated water is connected to this fitting and has a valve therein controlling flow of the heated water to the distributing member in the urn from which the water flows over the ground coffee or the like to brew the beverage which collects in a subjacent container in the urn. If, after a brewing operation, the operator fails to close the valve in the water outlet it may happen that incoming water will flow through the outlet into the coffee container and spoil the brewed beverage. One of the objects of my invention is to prevent incoming water from flowing into the brewed beverage even though the valve controlling water flow through the heated water outlet remains open.

It is desirable that the water flowing from the distributing member be uniformly distributed through the ground coffee or the like and to this end a distributing member including a plurality of small orifices has been used. However, due to their restricted size the orifices may be stopped up by foreign matter in the water or for other cause and this is especially true where water having a high lime content is used for the larger particles of lime suspended in the water do not pass through the small orifices. When some of the orifices are stopped up, the water tends to flow into the ground coffee from the open orifices with excessive force, and this stoppage of the orifices has other detrimental effects which result in improper operation of the urn. It is a further object of my invention to provide a novel distributing member adapted for use in a combination type urn to effect uniform distribution of the heated water to thereby insure efficient extraction of the essential elements from the coffee or the like and an ancillary object is to obviate likelihood of the distributing member being stopped up by foreign matter in the water or for other cause.

Further objects are to provide an urn of simple and economical construction and efficient and positive operation.

In the selected embodiment of the invention illustrated in the accompanying drawing Fig. 1 is a perspective view of a combination type urn and in which certain parts are broken away;

Figure 1:
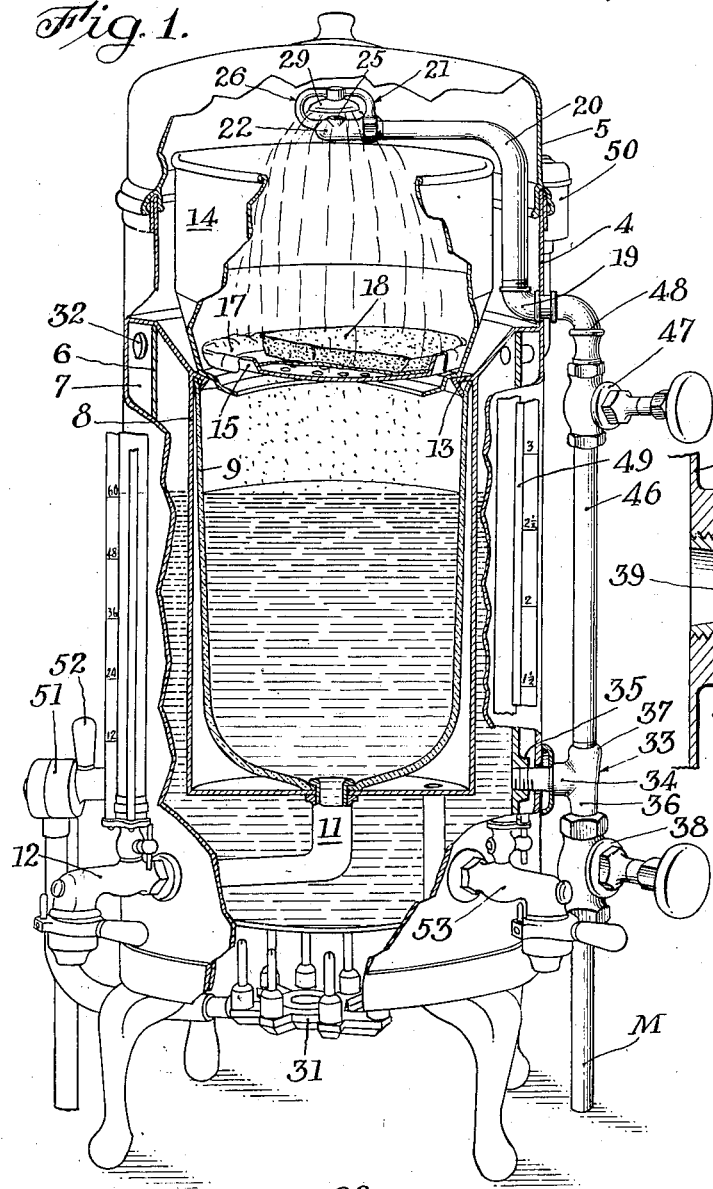
Figure 2:
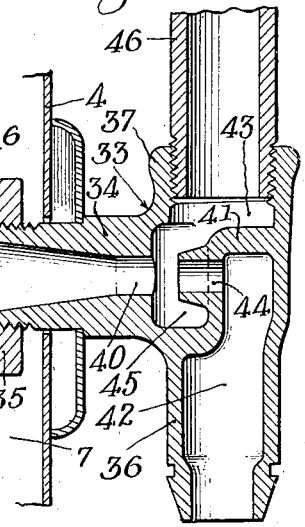
Fig. 2 is a detail sectional view of a novel fitting used in the urn.

The urn illustrated in the accompanying drawing includes an outer shell 4 having a lid 5 at the upper end thereof which may be moved to afford access to the interior of the urn. A water tank 6 is mounted in the shell and spaced therefrom and is so connected to the wall of the shell at the upper end thereof that leakage past the tank into the heat chamber 7 between the shell 4 and the tank 6 is prevented. A casing 8 is mounted within the tank 6 and is open at its upper end to receive the beverage container 9 which is also open at its upper end and which includes an outlet 11 leading to a faucet 12. A horizontal flange 13 is provided at the upper end of the casing 8 on which the lower end of the dripper 14 is rested. The dripper 14 has a removable perforated plate 15 closing the open lower end thereof. A filter cloth or paper 17 is arranged over the perforated plate and the ground coffee 18 or other similar substance is introduced onto the plate and is prevented from passing through the perforations therein by the filter 17. A fitting 19 is fast to the shell 4 above the top of the tank 6 and one end of a pipe 20 is screwed thereinto. The opposite end of the pipe 20 is bent to extend horizontally and terminates above and substantially medially of the dripper 14, the horizontal portion of the pipe being arranged immediately below the lid 5. When the lid 5 is moved from closing position, the pipe 20 is turned to one side to permit installation and removal of the dripper 14 and after the dripper is in position the pipe 20 is returned to the position illustrated in Fig. 1. The features of the urn thus far described constitute a preferred form with which my invention is used but changes or modifications may be made without departing from the purview of my invention.

Figure 3:
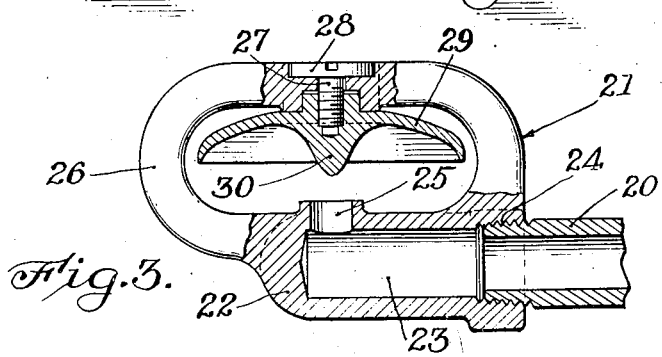
Fig. 3 is a partially sectional view of my novel water distributing member.

The water distributor, generally indicated by 21 and illustrated in Fig. 3, is mounted at the free end of the pipe 20. This water distributor includes a body 22 having a water passage 23 therein, the outer end of which is screw-threaded as at 24 for connection to the free end of the pipe 20 and this passage provides a pocket in the distributor. An outlet port 25 of substantial size is provided at the inner closed end and at the top of the passage 23. The distributor 21 includes a yoke 26 which extends above the body 22 and which has an opening 27 therein aligned with the port 25. A screw 28 extends through the opening 25 and fastens the deflector 29 in position. The deflector 29 is substantially saucer-shaped and includes a medially located protuberance 30 which is disposed immediately above and aligned with the port 25 and which projects toward the outlet. Water flowing through the pipe 20 and passage 23 passes out through the port 25 into engagement with the protuberance 30 and passes over the deflector 29 to flow from the edge thereof. The water so flowing is under sufficient pressure that it passes off the edge of the deflector 29 into engagement with the vertical wall of the dripper 14 which deflects it into the ground coffee or the like in such a manner that the water uniformly permeates through the coffee and extracts the essential elements and the water containing these essential elements which constitute the beverage then passes into the subjacent beverage container 9.

The water which flows through the pipe 20 is heated in the tank 6 by a suitable burner 31 disposed at the bottom of the tank, heat from the burner passing over the bottom of the tank and up through the chamber 7 and out through the openings 32 in the shell 4. A fitting generally indicated by 33 includes a stem 34 which is screw-threaded into a bushing 35 on tank 6 located above the bottom of the tank in a substantial distance. The fitting 33 includes an inlet stem 36 and an outlet stem 37 which are arranged preferably in alignment with each other and which extend at right angles to the stem 34. The stem 36 is connected to the outlet of a valve 38 or other suitable source of cold water, the inlet of the valve 38 in the present instance being connected to the water main M. A tapered passage 39 is provided in the stem 34 with the larger end thereof at the outer end of said stem. The inner end of the tapered passage terminates in a substantially straight portion 40. A web 41 is provided in the fitting 33 intermediate the inlet passage 42 in the inlet stem 36 and the chamber 43 in the outlet stem 37. A passage 44 is provided in the web in alignment with the passage 40. A chamber 45 is provided in the fitting 33 intermediate the passages 40 and 44 and in communication with the chamber 43. The passages 39, 40 and 44 and chamber 45 cooperate to provide what is in effect a venturi and the water flowing through these passages tends to create a vacuum in the chambers 45 and 43 and in the pipe or conduit 46 communicating with said chamber 43. A valve 47 is provided at the upper end of the pipe 46 and the outlet thereof is connected by a fitting 48 to the fitting 19. When the valve 38 is opened, water flows through the passage 42, passage 44, across chamber 45 to passage 40 and thence through passage 39 into the tank 6. Since this flow of water creates a suction in the chambers 45 and 43 and pipe 46, water does not flow into pipe 46 and hence even if valve 46 is open, incoming cold water cannot flow into and spoil the brewed beverage in container 9.

A suitable water gauge 49 of standard construction communicates with the tank 6 and indicates the water level therein. When the water in tank 6 is boiled, steam collects in the top of the tank 6 and the safety exhaust valve 50 avoids excess pressure. The safety valve is so set that the escape of steam therethrough indicates that the urn is ready for a beverage brewing operation. When it is desired to brew a beverage, the dripper 14 is arranged in position and the pipe 20 is turned to arrange the distributor 21 medially above the open upper end of the dripper. The valve 38 is closed at this time as is the valve 47. When the valve 47 is opened the steam collected in the tank 6 forces the water through passages 39 and 40, chambers 45 and 43 and pipe 46, past valve 47 through fittings 48 and 19 and the pipe 20 into passage 23 from whence it flows out through the outlet 25 into the distributor 21 in the manner described. Manifestly, when the water level in the tank 6 falls below the passage 39 water ceases to flow in the manner just described and as the passage 39 is located above the bottom of the tank 6 it is clear that all of the water is not withdrawn from the tank. After the water has passed from the distributor 21 and through the coffee or the like to brew the beverage, the valve 47 may be closed but even if this valve is not closed and the valve 38 is opened to admit a fresh supply of water into the tank 6, this water will not flow up through the pipe 46 and out through the distributor 21 and through the dripper 14 to spoil the brewed beverage collected in the container 9. When the desired quantity of water has been admitted to the tank 6, the valve 38 is closed and even if the valve 47 remains open cold water will not pass to the container 9 for if the valve 47 remains open until the water in tank 6 is heated to such a degree that steam is generated, it will be hot water that is forced through the pipe 46. However, this latter condition is avoided by providing a thermostat control 51 for the burner 31 and normally the handle 52 of the control is so positioned that the water in the tank 6 is kept below boiling temperature. When the handle 52 is manipulated so that the water in the tank 6 may be heated to the boiling point, the dripper 14 will have been furnished with a fresh supply of coffee or other substance and at this time the valve 47 is normally open and water will not flow thereby until pressure has been built up in the tank 6.

It is manifest from the foregoing description that I have provided an urn wherein cold water is prevented from passing to the brewed beverage stored in the urn. Moreover, I have provided a distributor which so disperses the admitted water that it is caused to uniformly permeate through the substance from which the beverage is to be brewed and I have equipped this distributor with a single orifice of substantial size so that it is not closed by lime or other substance contained in the water or for other cause.

While I have illustrated and described a selected embodiment of my invention it is to be understood that this is capable of variation and modification and I therefore do not wish to be limited to the precise details set forth but desire to avail myself of such changes and alterations as fall within the purview of the following claims.

I claim:

1. In a combination urn including a water jacket wherein water is heated prior to passage thereof to the distributing member in the urn, a fitting communicating with said jacket and including an inlet passage leading to a source of water and an outlet passage leading to the distributing member, said fitting also embodying a portion having means therein for creating suction in the outlet passage when water flows from said inlet passage to said jacket.

2. In a combination urn including a water jacket wherein water is heated prior to passage thereof through a conduit having control means therein regulating flow through the conduit to the distributing member in the urn, a fitting included in said conduit and having an inlet passage leading to a source of water, said fitting including a portion for creating suction in said conduit when water is flowing through said fitting from said inlet passage to said jacket whereby incoming water is prevented from flowing through said conduit past said control means to the distributing member.

3. In a combination urn including a water jacket wherein water is heated prior to passage thereof to the distributing member in the urn, a fitting having an inlet passage and an outlet passage and an intermediate part communicating with the water jacket, means connecting the inlet passage to a source of water, and means connecting the outlet passage to the distributing member in the urn, said fitting embodying a portion for creating suction in the outlet passage of the fitting as water flows from the inlet passage through the intermediate part into the water jacket.

4. In a combination urn including a water jacket wherein water is heated prior to passage thereof to the distributing member in the urn, a fitting having an inlet passage and an outlet passage and an intermediate part communicating with the water jacket, means connecting the inlet passage to a source of water, means connecting the outlet passage to the distributing member in the urn, said fitting having a venturi therein leading from the inlet passage through said intermediate part to the water jacket, and said fitting having a chamber therein through which communication between said venturi and the outlet passage is established whereby water flowing through the venturi from the inlet passage to the water jacket creates a suction in the outlet passage.

5. In a combination urn including a water jacket wherein water is heated prior to passage thereof to the distributing member in the urn, a fitting having an inlet passage and an outlet passage and an intermediate part communicating with the water jacket, means connecting the inlet passage to a source of water, means connecting the outlet passage to the distributing member in the urn, said intermediate part having an outwardly tapered passage therein, said fitting having a chamber therein communicating with said tapered passage and with said outlet passage, and said fitting having an opening therein aligned with said tapered passage and through which communication is established between said inlet passage and across said chamber with said tapered passage.

6. In a combination urn including a water jacket wherein water is heated prior to passage thereof to the distributing member in the urn, a fitting having an inlet passage and an outlet passage and an intermediate part communicating with the water jacket, means connecting the inlet passage to a source of water, means connecting the outlet passage to the distributing member in the urn, said intermediate part having an outwardly tapered passage therein, and a web in said fitting intermediate said inlet and said outlet passages and providing a chamber in communication with said tapered and said outlet passages and having an opening therein through which communication is established between said inlet passage and said tapered passage whereby water flow through said inlet, opening, and across said chamber through said tapered passage into the water jacket creates a suction in said chamber and said outlet passage.

7. In a combination urn including a water jacket, a fitting having inlet and outlet passages and a part communicating with said jacket, said fitting embodying a portion for creating suction in the outlet passage thereof as water flows from the inlet passage through said part into said jacket to be heated, a distributor including an outlet port and deflecting means, and means connecting the outlet passage of the fitting to said distributor whereby water heated in said jacket may flow through said fitting and means to said distributor subsequent to the flow thereof from said inlet through said part into said jacket, said suction created in the outlet of said fitting preventing incoming water from flowing to said distributor.

8. In a distributor for use in a coffee urn or the like, a body having a pocket therein and an outlet port of substantial size communicating with said pocket adjacent the closed end thereof, a yoke on said body including a part spaced from said body and disposed above said outlet port, a substantially saucer-shaped deflector having a medially located protuberance, and means connecting the deflector to said yoke with the protuberance in alignment with said outlet port.

EARL M. EVLETH.